US009244866B2

(12) United States Patent
Wee et al.

(10) Patent No.: US 9,244,866 B2
(45) Date of Patent: Jan. 26, 2016

(54) REMOTE ACCESS OF PERIPHERAL DEVICE CONNECTED TO SERIAL BUS

(75) Inventors: Liang Z. Wee, Techview (SG); Jessica M. J. Tan, Techview (SG); Hoon W. Soon, Techview (SG); Her J. Foo, Techview (SG); Hong C. Tan, Techview (SG)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 12/772,018

(22) Filed: Apr. 30, 2010

(65) Prior Publication Data

US 2011/0271027 A1    Nov. 3, 2011

(51) Int. Cl.
*G06F 15/16*    (2006.01)
*G06F 13/10*    (2006.01)

(52) U.S. Cl.
CPC ................... *G06F 13/102* (2013.01)

(58) Field of Classification Search
CPC .... G06F 3/1238; G06F 3/1205; G06F 13/105
USPC ......... 719/321; 710/305, 8; 703/26; 709/203, 709/227, 208
See application file for complete search history.

(56) References Cited

U.S. PATENT DOCUMENTS

| | | | |
|---|---|---|---|
| 6,230,118 B1 * | 5/2001 | Bader et al. ..................... 703/24 |
| 6,360,138 B1 | 3/2002 | Coppola et al. |
| 6,431,772 B1 * | 8/2002 | Melo et al. ..................... 400/70 |
| 6,614,548 B1 * | 9/2003 | Kisono ........................ 358/1.15 |
| 6,820,150 B1 * | 11/2004 | Joy et al. ..................... 710/110 |
| 7,447,762 B2 | 11/2008 | Curray et al. |
| 7,471,405 B2 * | 12/2008 | Sabbagh et al. ............. 358/1.15 |
| 2002/0051445 A1 * | 5/2002 | Drottar et al. ................. 370/362 |
| 2002/0059489 A1 * | 5/2002 | Davis et al. ..................... 710/72 |

(Continued)

FOREIGN PATENT DOCUMENTS

| CN | 1295396 A | 5/2001 |
|---|---|---|
| CN | 1479218 A | 3/2004 |

(Continued)

OTHER PUBLICATIONS

A. Flammini et al., "Sensor interfaces: from field-bus to Ethernet and Internet," Sensors and Actuators A 101, year 2002.

(Continued)

*Primary Examiner* — Thuong Nguyen
(74) *Attorney, Agent, or Firm* — Damion Josephs

(57) ABSTRACT

A computing device includes a hardware network component, a hardware serial component, device drivers, a network driver, and a serial driver. The hardware network component connects the computing device to other computing devices. The hardware serial component connects the computing device to peripheral devices over a serial bus. Each device driver is for one of these peripheral devices or for a peripheral device connected to a serial bus of one of the other computing devices. The network driver is for the hardware network component, and the serial driver is for the hardware serial component. The serial, network, and device drivers interact to permit the computing device to communicate with the peripheral devices of the other computing devices over a network. The device drivers for the peripheral devices of the other computing devices are unaware that these peripheral devices are not connected to the serial bus of the computing device.

10 Claims, 4 Drawing Sheets

(56) References Cited

U.S. PATENT DOCUMENTS

| | | | |
|---|---|---|---|
| 2002/0078337 A1* | 6/2002 | Moreau et al. | 713/1 |
| 2002/0191211 A1* | 12/2002 | Miller et al. | 358/1.15 |
| 2003/0045316 A1* | 3/2003 | Tjong et al. | 455/517 |
| 2003/0046674 A1* | 3/2003 | Gentry et al. | 717/171 |
| 2003/0169444 A1 | 9/2003 | Kemp et al. | |
| 2004/0220795 A1* | 11/2004 | Haley et al. | 703/26 |
| 2004/0230711 A1* | 11/2004 | Moon et al. | 710/8 |
| 2005/0068564 A1* | 3/2005 | Ferlitsch | 358/1.15 |
| 2005/0134904 A1* | 6/2005 | Voskuil | 358/1.15 |
| 2007/0048711 A1* | 3/2007 | Lee | 434/307 A |
| 2007/0060366 A1 | 3/2007 | Morrow et al. | |
| 2007/0110081 A1 | 5/2007 | Miller | |
| 2008/0005368 A1* | 1/2008 | Kreiner et al. | 710/8 |
| 2008/0092248 A1* | 4/2008 | He et al. | 726/36 |
| 2008/0098411 A1* | 4/2008 | Dirstine et al. | 719/327 |
| 2008/0219425 A1* | 9/2008 | Wang | 379/201.01 |
| 2008/0246628 A1 | 10/2008 | Spanier et al. | |
| 2008/0270525 A1* | 10/2008 | Thero et al. | 709/203 |
| 2009/0007153 A1* | 1/2009 | Mysore et al. | 719/321 |
| 2009/0013092 A1 | 1/2009 | Pao et al. | |
| 2009/0055525 A1 | 2/2009 | Slepov et al. | |
| 2009/0103496 A1* | 4/2009 | Purkayastha et al. | 370/332 |
| 2009/0249103 A1* | 10/2009 | Jeyaseelan et al. | 713/324 |
| 2010/0121959 A1* | 5/2010 | Lin et al. | 709/228 |
| 2010/0146104 A1* | 6/2010 | Chen et al. | 709/224 |
| 2010/0257226 A1* | 10/2010 | Niisato et al. | 709/203 |

FOREIGN PATENT DOCUMENTS

| | | |
|---|---|---|
| CN | 101361349 A | 2/2009 |
| JP | 2007219711 A | 8/2007 |
| JP | 2008009629 A | 1/2008 |
| JP | 2008210115 A | 9/2008 |
| JP | 2010117855 A | 5/2010 |

OTHER PUBLICATIONS

R. Husemann et al., "A multi-protocol real-time monitoring and validation system for distributed fieldbus-based automation applications," Control Engineering Practice 15, year 2007.

A. Flammini et al., "Sensor integration in industrial environment: from fieldbus to web sensors," Computer Standards & Interfaces 25, year 2003.

I. Mayikiv et al., "Remote reprogrammable NCAPs: issues and approaches," IEEE Int'l Workshop on Intelligent Data Acquisition & Advanced Computing Sys.: Technology & Applications, Sep. 6-8, 2007.

Z Chuan-Sheng et al., "Implementation of a general Ethernet interface for embedded system," 9th Int'l Conf. on Hybrid Intelligent Systems, year 2009.

J. Hildin, "Connecting network-based data acquisition nodes to the network," Proceedings of the Int'l Telemetering Conf., Oct. 23-26, 2006.

\* cited by examiner

REMOTE ACCESS OF PERIPHERAL DEVICE CONNECTED TO SERIAL BUS

FIELD OF THE INVENTION

The present invention relates generally to peripheral devices that are connected to a serial bus of a computing device, where the serial bus may be an RS-485 serial bus. The present invention relates more specifically to a computing device remotely accessing such peripheral devices that are connected to a serial bus of another computing device.

BACKGROUND OF THE INVENTION

Peripheral devices are commonly connected to computing devices to extend the functionality of the computing devices. Peripheral devices include point-of-sale (POS) devices, such as cash registers, handheld bar code scanners, and other types of POS devices. Some types of peripheral devices are connected to a serial bus of a computing device. For example, the serial bus may be an RS-485 serial bus, an RS-423 serial bus, an RS-422 serial bus, or an RS-232 serial bus.

SUMMARY OF THE INVENTION

A system of an embodiment of the invention includes a number of computing devices. Each computing device includes a hardware network component, a hardware serial component, device drivers, a network driver, and a serial driver. The hardware network component connects the computing device to the other computing devices over a network. The hardware serial component connects the computing device to one or more peripheral devices over the serial bus. Each device driver is for one of the peripheral devices of the computing device or for one of the peripheral devices of the other computing devices. The network driver is for the hardware network component, and the serial driver is for the hardware serial component. Within each computing device, the serial driver, the network driver, and the device drivers interact to permit the computing device to communicate with the peripheral devices of the other computing devices over the network.

A method of an embodiment of the invention sends first data for a first peripheral device from a first application program of a first computing device to a first device driver of the first computing device for the first peripheral device. The method prepares a first frame including the first data, by the first device driver. The method sends the first frame from the first device driver to a first serial driver of the first computing device. The method determines, by the first serial driver, whether the first peripheral device is connected to a first serial bus of the first computing device or whether the first peripheral device is connected to a second serial bus of a second computing device. Where the first peripheral device is connected to the second serial bus, the method wraps the first frame within a first network packet, by the first serial driver, and sends the first network packet from the first computing device to the second computing device over a network.

In one embodiment, the method also receives a second network packet by the second computing device from the first computing device over the network. The method determines, by a second serial driver of the second computing device, whether the second network packet has wrapped therein a second frame of second data associated with a second peripheral device. Where the second network packet has wrapped therein a second frame of second data associated with a second peripheral device, the method unwraps the second frame from the second network packet, by the second serial driver. The method then determines, by the second serial driver, whether the second peripheral device is connected to the second serial bus or to the first serial bus. Where the second peripheral device is connected to the first serial bus, the method sends the second frame from the second serial driver to a second device driver of the second computing device for the second peripheral device. The method then decodes the second data from the second frame, by the second device driver, and sends the second data from the second device driver to a second application program of the second computing device.

A computer program product of an embodiment of the invention includes a computer-readable storage medium having computer-readable code embodied therein. The computer-readable code is executable by a first computing device having a first device driver and a second device driver. The first device driver is for a first peripheral device connected to a first serial bus of the first computing device. The second device driver is for a second peripheral device connected to a second serial bus of a second computing device. The computer-readable code includes first computer-readable code to receive a first frame of first data from one of the device drivers. The computer-readable code includes second computer-readable code to determine whether the first frame of first data is associated with the first peripheral device with the second peripheral device. The computer-readable code includes third computer-readable code to wrap the first frame of first data within a first network packet and to cause the first frame of first data to be sent to the second computing device over a network, where the first frame of first data is associated with second peripheral device.

A computing device of an embodiment of the invention includes a hardware network component, a device driver, and a network driver. The hardware network component is to connect the computing device to one or more other computing devices over a network. The device driver is for a peripheral device connected to a serial bus of one of the other computing devices. The network driver is for the hardware network component. The network driver and the device driver interact to permit the computing device to communicate with the peripheral device over the network.

BRIEF DESCRIPTION OF THE SEVERAL VIEWS OF THE DRAWINGS

The drawings referenced herein form a part of the specification. Features shown in the drawing are meant as illustrative of only some exemplary embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, some types of peripheral devices, such as some types of point-of-sale (POS) devices, are connected to a serial bus of a computing device, such as an RS-485 serial bus, an RS-423 serial bus, an RS-422 serial bus, or an RS-232 serial bus. Such a peripheral device connected to a serial bus of a particular computing device is said to be local to the particular computing device, and is said to be remote to any other computing device. A computing device is typically unable to communicate with peripheral devices that are connected to serial buses of other computing devices. That is, peripheral devices that are connected to serial buses are typically only able to communicate with local computing devices and are unable to communicate with remote computing devices.

By comparison, embodiments of the invention permit a computing device to communicate with peripheral devices that are connected to serial buses of other computing devices. That is, embodiments of the invention permit peripheral devices that are connected to serial buses to be able to communicate with remote computing devices as well as with local computing devices. As such, a given computing device can communicate with peripheral devices that are connected to the serial bus of the given computing device, as well as with peripheral devices that are connected to serial buses of other computing devices, in accordance with embodiments of the invention.

Figure 1:
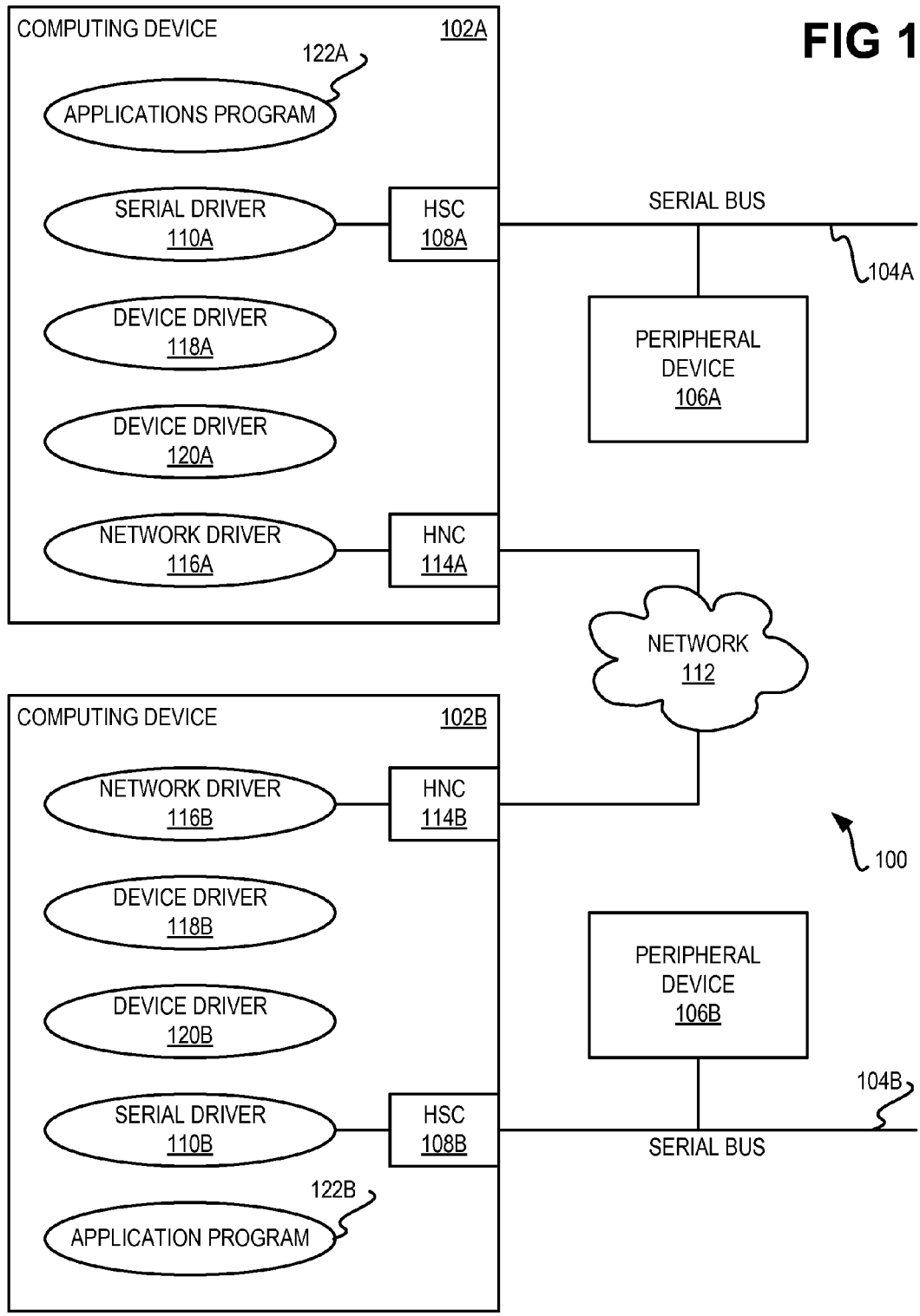
FIG. 1 is a diagram of a system of computing devices having serial buses to which peripheral devices are connected, according to an embodiment of the present invention.

FIG. 1 shows a system 100, according to an embodiment of the invention. The system 100 includes two computing devices 102A and 102B, collectively referred to as the computing devices 102. However, in another embodiment, there may be more than two computing devices 102. The computing devices 102 include serial buses 104A and 104B, respectively, which are collectively referred to as the serial buses 104. The serial buses 104 may be RS-485 serial buses, RS-423 serial buses, RS-422 serial buses, or RS-232 serial buses in one embodiment.

Connected to the serial buses 104 are peripheral devices 106A and 106B, respectively, which are collectively referred to as the peripheral devices 106. In the example of FIG. 1 there is one peripheral device 106 connected to each serial bus 104. However, in another embodiment, there may be more than one peripheral device 106 connected to each serial bus 104, particularly where the serial bus 104 in question is a multi-point or multi-drop serial bus like an RS-485 serial bus. The peripheral devices 106 may be POS devices in one embodiment, such as cash registers, handheld bar code scanners, and other types of POS devices.

The peripheral device 106A is local to the computing device 102A because the peripheral device 106A is connected to the serial bus 104A of the computing device 102A. Likewise, the peripheral device 106B is local to the computing device 102B because the peripheral device 106B is connected to the serial bus 104B of the computing device 102B. The peripheral device 106A is remote to the computing device 102B because the peripheral device 106A is not connected to the serial bus 104B of the computing device 102B. Likewise, the peripheral device 106B is remote to the computing device 102A because the peripheral device 106B is not connected to the serial bus 104A of the computing device 102A.

The computing devices 102 include hardware serial components 108A and 108B, respectively, which are collectively referred to as the hardware serial components 108. The hardware serial components 108 each include the physical connector or port, and any needed hardware, for the corresponding computing device 102 to communicate with the peripheral device 106 over the corresponding serial bus 104. For example, each hardware serial component 108 may include a suitable microcontroller in this respect.

The computing devices 102 similarly include hardware network components 114A and 114B, respectively, which are collectively referred to as the hardware network components 114. The hardware network components 114 each include the physical connector or port, and any needed hardware, for the corresponding computing device 102 to communicate with a network 112. For example, each hardware network component 114 may be or include a network interface controller (NIC). Via the hardware network components 114 communicating with the network 112, the computing devices 102 are communicatively interconnected with each another.

The computing devices 102 include application programs 122A and 122B, respectively, which are collectively referred to as the application programs 122. The application programs 122 are each a computer program running on an operating system of a corresponding computing device 102 to perform a desired functionality, particularly in relation to the peripheral devices 106. For example, if a peripheral device 106 is a bar code scanner, an application program 122 may receive information represented by a bar code scanned by the device 106, and process the information. In this respect, the application programs 122 can be said to interact with the peripheral devices 106.

The computing devices 102 include serial drivers 110A and 110B, respectively, which are collectively referred to as the serial drivers 110. The serial drivers 110 are each a driver computer program installed within an operating system of a corresponding computing device 102 so that the corresponding hardware serial component 108 and hence the corresponding serial bus 104 are accessible by software. For example, as to the computing device 102A, the serial driver 110A is installed within an operating system of the computing device 102A so that the hardware serial component 108A and hence the corresponding serial bus 104A are accessible by software. The same is true for the computing device 102B, as to the serial driver 110B in relation to the hardware serial component 108B and the serial bus 104B.

The computing devices 102 include device drivers 118A and 118B, respectively, which are collectively referred to as the device drivers 118. The device drivers 118 are each a driver computer program installed within an operating system of a corresponding computing device 102 for specifically accessing the peripheral device 106A. For example, as to the computing device 102A, the device driver 118A is installed within an operating system of the computing device 102A so that the peripheral device 106A is accessible by software like the application program 122A. The same is true for the computing device 102B, as to the device driver 118B, the peripheral device 106A, and the application program 122B.

It is noted, however, that the device driver 118B in particular is not aware that the peripheral device 106A is not connected to the serial bus 104B of the computing device 102B. In this respect, the device driver 118B can be coded identically as the device driver 118A is coded. Furthermore, because the device driver 118B is not aware that the peripheral device 106A is not connected to the serial bus 104B, the application program 122B is also unaware that the peripheral device 106A is not connected to the serial bus 104B.

The computing devices 102 also include device drivers 120A and 120B, respectively, which are collectively referred to as the device drivers 120. The device drivers 120 are each a driver computer program installed within an operating system of a corresponding computing device 102 for specifically accessing the peripheral device 106B. For example, as to the computing device 102A, the device driver 120A is installed within an operating system of the computing device 102A so that the peripheral device 106B is accessible by software like the application program 122A. The same is true for the computing device 102B, as to the device driver 120B, the peripheral device 106B, and the application program 122B.

It is noted, however, that the device driver 118B in particular is not aware that the peripheral device 106B is not connected to the serial bus 104A of the computing device 102A. In this respect, the device driver 120A can be coded identically as the device driver 120B is coded. Furthermore, because the device driver 118A is not aware that the peripheral device 106B is not connected to the serial bus 104A, the application program 122A is also unaware that the peripheral device 106B is not connected to the serial bus 104A.

The computing devices 102 include network drivers 116A and 116B, respectively, which are collectively referred to as the network drivers 116. The network drivers 116 are each a driver computer program installed within an operating system of a corresponding computing device 102 so that the corresponding hardware network controller 114 and hence the network 112 is accessible by software. For example, as to the computing device 102A, the network driver 116A is installed within an operating system of the computing device 102A so that the hardware network controller 114A and hence the network 112 are accessible by software. The same is true for the computing device 102B, as to the network driver 116B in relation to the hardware network controller 114B and the network 112.

As noted above, typically a computing device cannot access peripheral devices that are connected to serial buses of other computing devices, but rather can only access peripheral devices that are connected to its own serial bus. For example, in relation to FIG. 1, typically the computing device 102A is unable to access the peripheral device 106B, and typically the computing device 102B is unable to access the peripheral device 106A. However, embodiments of the invention permit the computing device 102A to access the peripheral device 106B in addition to the peripheral device 106A, and the computing device 102B to access the peripheral device 106A in addition to the peripheral device 106B.

This is achieved by the serial driver 110, the network driver 116, and the device drivers 118 and 120 within each computing device 102 interacting with one another to permit the computing devices 102 to access the remote peripheral device 106 over the network 112. The serial drivers 110 are modified, as compared to the prior art, so that requests from a computing device 102 for a remote peripheral device 106 are sent over the network 112. The serial drivers 110 are also modified, as compared to the prior art, so that responses from a peripheral device 106 that are intended for a remote computing device 102 are sent over the network 112. By comparison, the device drivers 118 and 120 may remain unchanged as compared to the prior art. The network drivers 116 may be modified as compared to the prior art only to the extent that the serial drivers 110 inspect network packets received over the network 112 before the network drivers 116 do. How the serial drivers 110 are modified is particularly described by an explanation of their functionality, in relation to FIGS. 2 and 3.

Figure 2:
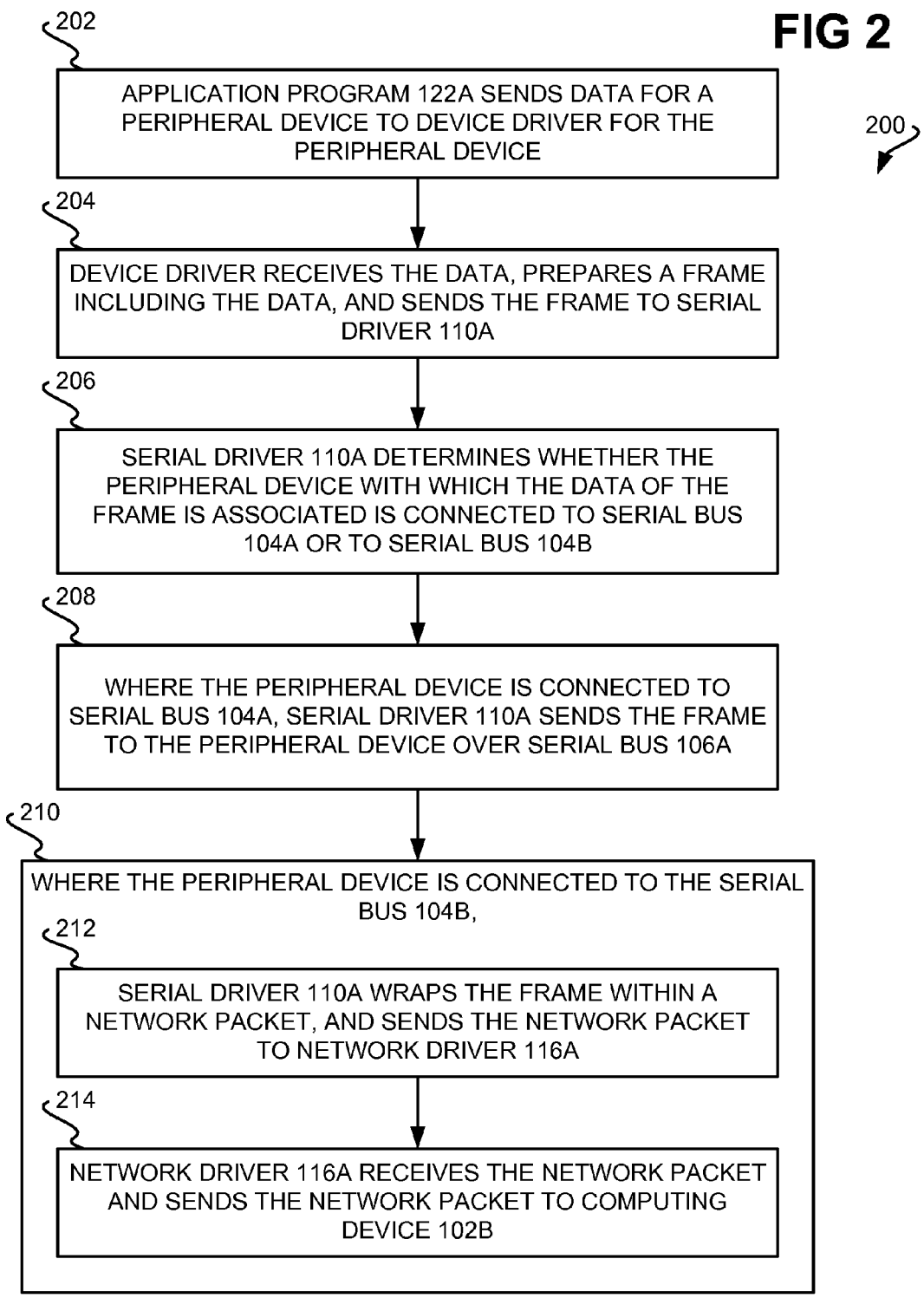
FIG. 2 is a flowchart of a method that can be performed in relation to the system of FIG. 1, according to an embodiment of the present invention.

FIG. 2 shows a method 200 exemplarily depicting data being sent by the application program 122A of the computing device 102A to a peripheral device—such as either the peripheral device 106A or the peripheral device 106B—according to an embodiment of the invention. The application program 122A sends the data for the peripheral device to the device driver for the peripheral device (202). For example, if the application program 122A is sending data for the peripheral device 106A, then the data is sent to the device driver 118A, whereas if the program 122A is sending data for the peripheral device 106B, then the data is sent to the device driver 120A.

The device driver in question receives the data from the application program 122A, prepares a frame including the data, and sends the frame to the serial driver 110A (204). The frame is a data structure that identifies the intended peripheral device on the serial bus in question. For example, if there are multiple peripheral devices on a serial bus, then data specifically intended for one such peripheral device is included within a frame that identifies this peripheral device. This frame may be an RS-485 frame, for instance, and may also identify the sender of the data, a checksum value to ensure integrity of the data, as well as other information.

The serial driver 110A receives the frame, and determines whether the peripheral device with which the data of the frame is associated is connected to the serial bus 104A or to the serial bus 104B (206). For example, in one embodiment, the serial driver 110A maintains a table of each computing device 102 within the system 100, such as by media access controller (MAC) address, as well as of each peripheral device 106 connected to the serial bus 104 of each computing device 102. By referring to the table, then, the serial driver 110A determines whether the peripheral device with which the data of the frame is associated is connected to the local serial bus 104A, or to the remote serial bus 104B.

Where the peripheral device in question is connected to the local serial bus 104A, the serial driver 110A sends the frame to the peripheral device over the serial bus 104A via the hardware serial component 108A (208). However, where the peripheral device in question is connected to the remote serial bus 104B, the serial driver 110A wraps the frame within a network packet, and sends the network packet to the network driver 116A (212). The network driver 116A receives the network packet and sends it to the computing device 102B for transmission to the peripheral device 106B (214). The network packet within which the serial driver 110A has wrapped the frame identifies the computing device 102B as the computing device to which the serial bus 104B is local. The structure of the network packet is described in more detail later in the detailed description.

It is noted that neither the application program 122A nor the device driver 118A or 120A is aware whether the peripheral device to which the program 122A is sending data is connected to the local serial bus 104A or not. The application program 122A simply sends the data to the appropriate device driver 118A or 120A for the peripheral device. The device driver 118A or 120A simply prepares a frame including the data, and sends the frame to the serial driver 110A. It is the serial driver 110A that determines whether the peripheral device is a local peripheral device or a remote peripheral device. In the former case, the serial driver 110A sends the frame over the serial bus 104A for receipt by the peripheral device.

In the latter case, the serial driver 110A wraps the frame in a network packet, and sends the network packet to the network driver 116A for transmission to the local computing device of the serial bus to which the peripheral device is connected. The network driver 116A sends the network packet to the local computing device in question via the hardware network component 114A and over the network 112. The network driver 116A is also unaware that the intended peripheral device is remote, insofar as the network driver 116A transmits the network packet over the network 112 no differently than any other network packet.

Figure 3:
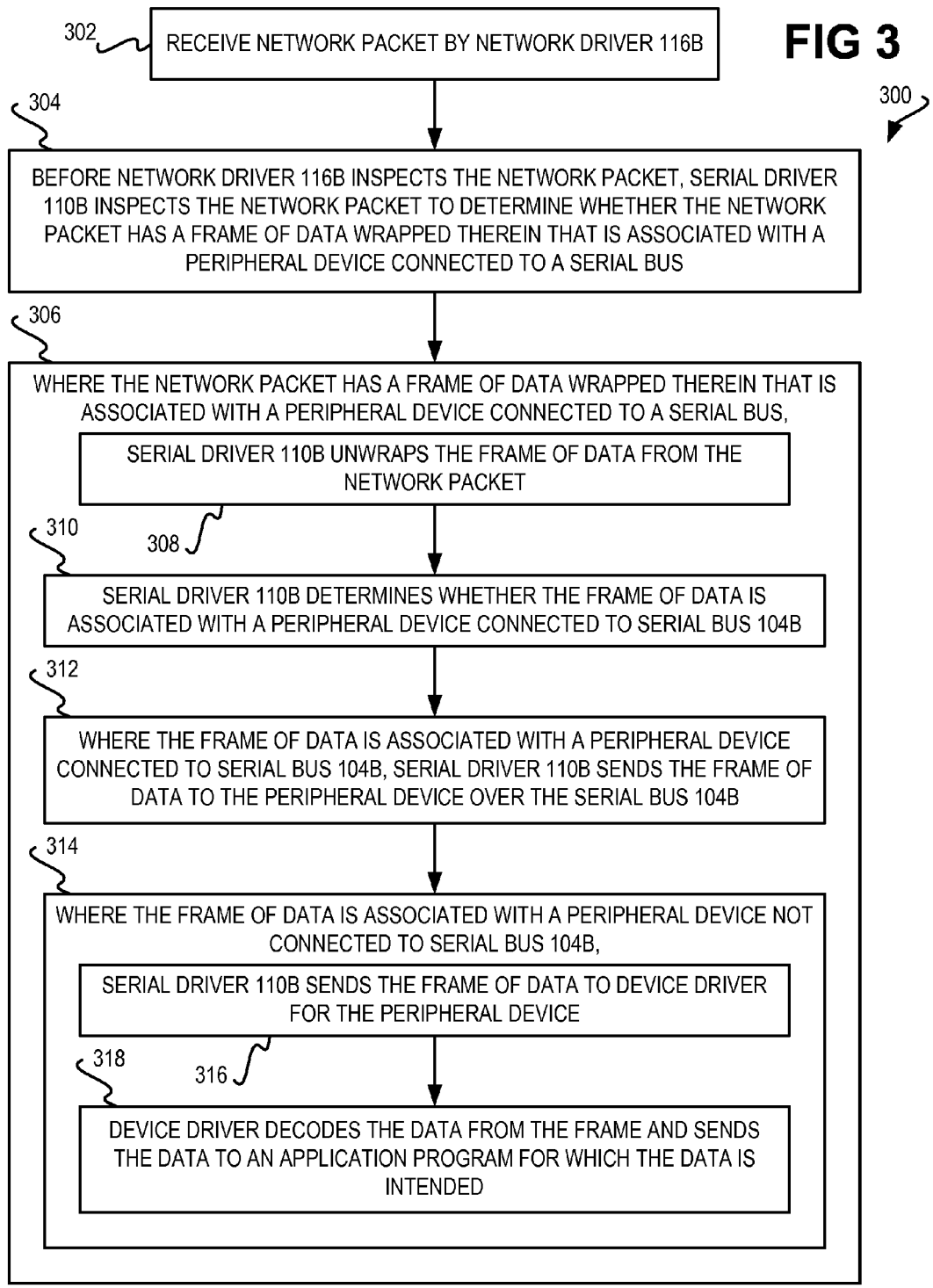
FIG. 3 is a flowchart of another method that can be performed in relation to the system of FIG. 1, according to an embodiment of the present invention.

FIG. 3 shows a method 300 exemplarily depicting data associated with a peripheral device being received by the computing device 102B, according to an embodiment of the invention. For instance, the data may be sent from the application program 122A of the computing device 102A and intended for the peripheral device 106B connected to the serial bus 104B of the computing device 102B. As another example, the data may be sent from the peripheral device 106A connected to the serial bus 104A of the computing device 102A as a response back to the application program 122B that previously generated a request to the peripheral device 106A.

The network driver 116B receives a network packet in which a frame including the data is wrapped, via the hardware network controller 114B and from over the network 112 (302). Before the network driver 116B inspects the network packet, however, the serial driver 110B inspects the network packet to determine whether the network packet has a frame of data wrapped therein that is associated with a peripheral device that is connected to a serial bus (304). If the network packet does not have such a frame of data wrapped therein, then the network packet is processed conventionally by the network driver 116B.

However, where the network packet has a frame of data wrapped therein that is associated with a peripheral device connected to a serial bus, then the following is performed (306). The serial driver 110B unwraps the frame of data from the network packet (308). The serial driver 110B also determines whether the frame of data is associated with a peripheral device connected to the serial bus 104B (310). That is, the serial driver 110B determines whether the frame of data is associated with a peripheral device that is local to the computing device 102B. This determination can be made by referring to a table, as has been described above in relation to the method 200 of FIG. 2.

Where the frame of data is associated with a peripheral device connected to the serial bus 104B, the serial driver 110B sends the frame of data to the peripheral device over the serial bus 104B via the hardware serial component 108B (312). In this case, the data included within the frame was generated at another computing device, such as by an application program at another computing device. The frame itself was also generated at another computing device, such as by the serial driver at another computing device.

Where the frame of data is associated with a peripheral device that is not connected to the serial bus 104B, however, then the following is performed (314). The serial driver 110B sends the frame of data to the local device driver for the peripheral device (316). For example, if the peripheral device in question is the peripheral device 106A, then the serial driver 110B sends the frame of data to the device driver 118B for the peripheral device 106A.

The device driver receives the frame of data, decodes the data from the frame, and sends the data to an application program for which the data is intended (318). In this case, the data included within the frame was generated at a remote peripheral device connected to a serial bus at another computing device. The remote peripheral device may have generated the frame as well, or the serial driver at this other computing device may have generated the frame.

For example, the application program 122B may have originally sent data to the peripheral device 106A, in accordance with the method 200 of FIG. 2, to request that the peripheral device 106A return data. Upon receiving the request, the peripheral device 106A generates responsive data, and sends the responsive data back to the application program 122B. In this case, the method 300 of FIG. 3 is performed to receive the network packet in which the frame including the data is wrapped, and to ultimately send the data to the application program 122B.

The device driver that decodes the data from the frame and sends the data to the application program for which the data is intended may know the identity of the application program in one of a number of different ways. In one embodiment, just one computer program at a time may be able to maintain a communication session with the peripheral device in question. Therefore, the device driver knows which computer program has a communication session its peripheral device, such that data returned from the peripheral device is automatically sent to this computer program.

In another embodiment, however, multiple computer programs may be able to access the peripheral device at the same time. In this case, the application program for which the data is intended may be have a unique, or substantially unique, identifier that is used in all communication to and from the peripheral device. The device driver for the peripheral device keeps track of these unique identifiers, so that the application programs correctly receive the data intended for them from the peripheral device.

It is noted that neither the application program 122B, the network driver 116B, nor the device driver 118B or 120B is aware whether the peripheral device from which the program 122B is receiving data is connected to the local serial bus 104B or not. The appropriate device driver 118B or 120B for the peripheral device simply receives a frame including the data from the serial driver 110B. The application program 122B simply receives the data decoded from the frame from the appropriate device driver 118B or 120B. Furthermore, the network driver 116B simply receives the network packet from over the network 112, no differently than the driver 116B receives any other network packet from over the network 112.

Rather, it is the serial driver 110B that is aware whether the peripheral device from which the application program 122B is receiving data is connected to the local serial bus 104B or not. The serial driver 110B receives data both from the peripheral device 106B and from the peripheral device 106A, the latter over the network 112 via the network driver 116B and the hardware network component 114B. Once the serial driver 110B has unwrapped a frame of data from a network packet, the frame of data is no different than a frame of data received from a local peripheral device connected to the serial bus 104B.

Figure 4:
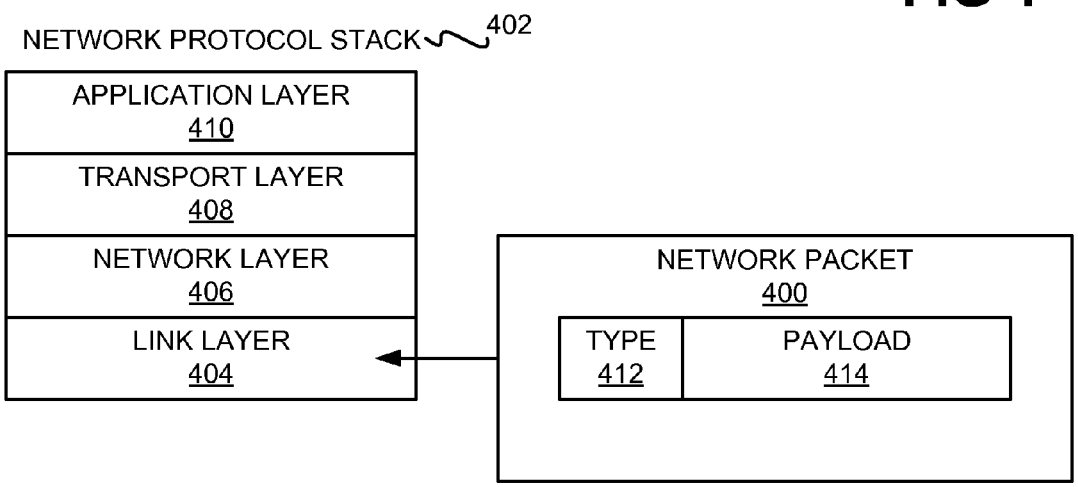
FIG. 4 is a diagram depicting a representative network packet in relation to a typical network protocol stack, according to an embodiment of the present invention.

FIG. 4 shows a representative network packet 400 in relation to a network protocol stack 402 to explain how the frame of data may be wrapped in the network packet 400, according to an embodiment of the invention. The network protocol stack 402 includes a link layer 404, a network layer 406, a transport layer 408, and an application layer 410. As such, the network protocol stack 402 may be a conventional network protocol stack, as is used with transmission control protocol (TCP)/Internet protocol (IP) communication.

The link layer 404 is responsible for communicating with the actual network hardware, as the lowest layer within the network protocol stack 420. The link layer 404 identifies devices by MAC addresses typically, and not by numeric addresses, such as IP addresses. By comparison, the network layer 406 is responsible for determining how to route data over a network, and it is at this layer that devices are addressed by numeric addresses, such as by IP addresses. The transport layer 408 provides for data flows for the application layer 410, and at this layer the TCP resides. Finally, the application layer 410 is where computer programs typically interact with a network, such that applications like the file transmission protocol (FTP), telnet, email, and so on reside at the application layer 410.

In the embodiment of FIG. 4, the frame of data is wrapped within a network packet 400 at the link layer 404. Specifically, at the link layer 404, the network packet 400 has a particular type 412, such as the Ethernet type. The embodiment of FIG. 4 reserves a particular value for this type 412, such as 0x1234, to identify that the payload 414 of the network packet 400 contains (i.e., has wrapped therein) a frame of data for a peripheral device connected to a serial bus. Therefore, when a serial driver inspects a network packet to determine whether such a frame of data is wrapped therein, the serial driver can simply determine whether the type 412 of the network packet 400 matches the predetermined value in question.

That the frame of data is wrapped within the network packet 400 at the link layer 404 imbues the embodiment of FIG. 4 with certain properties. First, the computing device to which the peripheral device of the frame of data is local is identified by one or more other fields of the network packet 400 by MAC address, and not by a routable numeric address such as a routable IP address. This means that the serial drivers of the computing devices do not have to maintain the IP addresses of the computing devices 102, which can change, but rather just the MAC addresses of the devices 102, which generally do not change.

More importantly, second, the network packet 400 that contains a frame of data is not routable within the network 112. That is, both the source computing device of the network packet 400 and the destination computing device of the network packet 400 have to be connected to one another via one or more network switches or hubs, and without any intervening routers. Routers are network devices that are able to route network packets to the appropriate network devices by their associated routable addresses, such as IP addresses. However, the network packet 400 is not identified by a routable address like an IP address, but rather is identified just by a MAC address.

This second property of the embodiment of FIG. 4 results in two effects. First, it limits the remote peripheral devices with which a given computing device can communicate to those peripheral devices that are connected to the serial buses of computing devices that are not separated from the given computing device within the network 112 by a router. As such, the remote peripheral devices with which a given computing device can communicate over the network 112 is more limited than the computing devices with which the given computing device can communicate over the network 112.

However, second, this limitation provides for added and inherent security within the embodiment of FIG. 4. In particular, even if the network 112 is exposed to an external network like the Internet, external nefarious or malicious attempts to gain access to the peripheral devices 106 will more than likely fail. This is because such external attempts to gain access to the peripheral devices 106 will originate from source computing devices that are necessarily separated from the computing devices 102 by a router. As such, unless the source computing devices know or guess the MAC addresses of the computing devices 102, which is highly unlikely, the source computing devices will be unable to access the peripheral devices 106, even if they are able to access the computing devices 102 having the serial buses 104 to which the peripheral devices 106 are connected.

Figure 5:
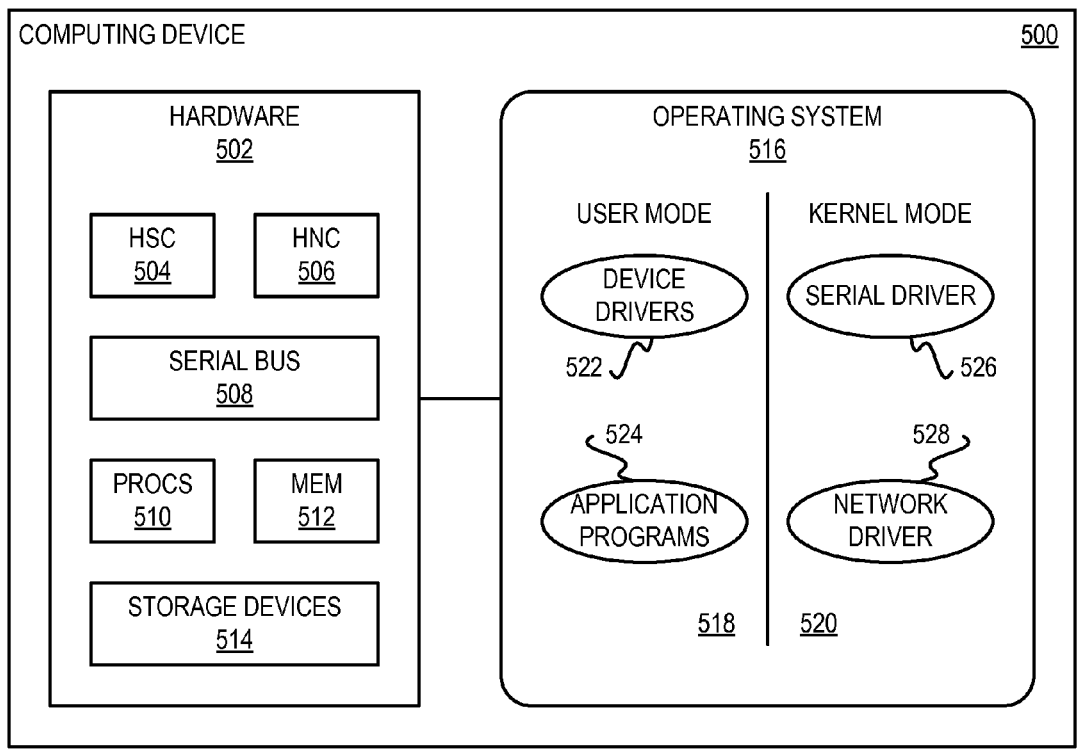
FIG. 5 is a diagram of a computing device, according to an embodiment of the present invention.

FIG. 5 shows a representative computing device 500 that can implement any computing device 102 of FIG. 1, according to an embodiment of the invention. The computing device 500 includes hardware 502, such as a hardware serial component 504, a hardware network component 506, and a serial bus 508, as have been described. The hardware 502 also typically includes one or more processors 510, volatile memory 512, and non-volatile storage devices 514. The hardware 502 further can include other types of hardware, in addition to and/or in lieu of those depicted in FIG. 5.

The computing device 500 includes an operating system 516. The operating system 516 and its constituent components are said to be implemented by the hardware 502, insofar as they are software that are stored on and executed from and by the hardware 502. The operating system 516 is divided into a user mode 518 and a kernel mode 520. Device drivers 522 for the peripheral devices connected to the serial bus 508, as well as application programs 524, run within the user mode 518, whereas the serial driver 526 and the network driver 528 run within the kernel mode 520. It is noted that while the drivers 522, 526, and 528 may be considered part of and constituent components of the operating system 516, the application programs 522 are not.

The distinction between the user mode 518 and the kernel mode 520 is made so that a certain amount of protection, or security, can be provided to the critical system processes that run in the kernel mode 520, so that these processes may not be directly affected from within the user mode 518. The kernel mode 520 thus contains the kernel of the computing device 500, which is the fundamental part thereof, including the critical components of the operating system 516, and which provides basic services to the application programs 524 running within the user mode 518.

As can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A system comprising:
   a remote computing device comprising a serial bus, a hardware network component to connect the remote computing device to a network, and a hardware serial component to connect the remote computing device to a peripheral device connected over the serial bus;
   a local computing device comprising:
      a serial bus and a hardware serial component to connect the local computing device to a peripheral device over the serial bus;
      a hardware network component to connect the local computing device to the network and a network driver for the hardware network component;
      a first device driver for the peripheral device of the remote computing device;
      a second device driver for the peripheral device of the local computing device;
      an application computer program to:
         generate first communication for the peripheral device of the remote computing device, the application computer program unaware that the peripheral device of the remote computing device is not of the local computing device; and generate second communication for the peripheral device of the local computing device; and a serial driver for the hardware serial component and separate from the first device driver and the second device driver, to:

receive from the application computer program the first communication despite the first communication being for the peripheral device of the remote computing device and not for the peripheral device of the local computing device;

after receiving the first communication, determine that the first communication is for the peripheral device of the remote computing device;

in response to determining that the first communication is for the peripheral device of the remote computing device, wrap the first communication within a network packet and send the network packet including the first communication to the network driver for transmission over the network to the hardware network component of the remote computing device for the hardware network component of the remote computing device to relay to the hardware serial component of the remote computing device to send to the peripheral device of the remote computing device over the serial bus of the remote computing device;

receive from the application computer program the second communication;

after receiving the second communication, determine that the second communication is for the peripheral device of the local computing device;

in response to determining that the second communication is for the peripheral device of the local computing device, send the second communication to the peripheral device of the local computing device over the serial bus of the local computing device, wherein and such that the serial driver receives both the first communication for the peripheral device of the remote computing device and the second communication for the peripheral device of the local computing device, and wherein a serial driver of the remote computing device unwraps the first communication from the network packet upon the remote computing device receiving the network packet.

2. The system of claim 1, wherein the serial driver, the network driver, and the first device driver of the local computing device interact with one another to permit the local computing device to communicate with the peripheral device of the remote computing device.

3. The system of claim 1, wherein the serial driver and the second device driver of the local computing device interact with one another to permit the local computing device to communicate with the peripheral device of the local computing device.

4. The system of claim 1, wherein the serial driver receives all serial communications from the application computer program regardless of whether the serial communications are for the peripheral device connected to the serial bus of the local computing device or are for the peripheral device connected to the serial bus of the remote computing device.

5. A computing device comprising:

a serial bus and a hardware serial component to connect the computing device to a peripheral device over the serial bus;

a hardware network component to connect the computing device to a network and a network driver for the hardware network component;

an application computer program to generate first communication for a peripheral device connected to a serial bus of a remote computing device connected to the network, and to generate second communication for the peripheral device of the computing device, the application computer program unaware that the peripheral device of the remote computing device is not of the computing device;

a first device driver for the peripheral device of the remote computing device;

a second device driver for the peripheral device of the computing device; and a serial driver for the hardware serial component to:

receive from the application computer program the first communication despite the first communication being for the peripheral device of the remote computing device and not for the peripheral device of the computing device;

after receiving the first communication, determine that the first communication is for the peripheral device of the remote computing device;

in response to determining that the first communication is for the peripheral device of the remote computing device, wrap the first communication within a network packet and send the network packet including the first communication to the network driver for transmission over the network to the hardware network component of the remote computing device for the hardware network component of the remote computing device to relay to the hardware serial component of the remote computing device to send to the peripheral device of the remote computing device over the serial bus of the remote computing device;

receive from the application computer program the second communication;

after receiving the second communication, determine that the second communication is for the peripheral device of the computing device;

in response to determining that the second communication is for the peripheral device of the computing device, send the second communication to the peripheral device of the computing device over the serial bus of the computing device, wherein and such that the serial driver receives both the first communication for the peripheral device of the remote computing device and the second communication for the peripheral device of the local computing device, and wherein a serial driver of the remote computing device unwraps the first communication from the network packet upon the remote computing device receiving the network packet.

6. The computing device of claim 5, wherein the serial driver, the network driver, and the first device driver of the computing device interact with one another to permit the computing device to communicate with the peripheral device of the remote computing device.

7. The computing device of claim 5, wherein the serial driver and the second device driver of the computing device interact with one another to permit the computing device to communicate with the peripheral device of the computing device.

8. A method comprising:
- receiving, by a first device driver of a local computing device for a peripheral device connected over a serial bus of a remote computing device, first communication for the peripheral device from an application computer program running on the local computing device;
- preparing, by the first device driver, a frame including the first communication;
- sending, by the first device driver, the frame to a serial driver for a hardware serial component connecting a peripheral device to a serial bus of a local computing device;
- receiving, by the serial driver from the first device driver the frame including the first communication, the application computer program unaware that the peripheral device of the remote computing device is not of the local computing device, the serial driver receiving the frame including the first communication despite the first communication being for the peripheral device of the remote computing device and not for the peripheral device of the computing device, the local computing device including a second device driver for the peripheral device of the local computing device;
- after receiving the first communication, determining by the serial driver that the first communication is for the peripheral device of the remote computing device;
- in response to determining that the first communication is for the peripheral device of the remote computing device, wrapping the frame including the first communication within a network packet and sending the network packet including frame that includes the first communication by the serial driver to a network driver for a hardware network component connecting the local computing device to a network to which the remote computing device is connected, for transmission over the network to the hardware network component of the remote computing device for the hardware network component of the remote computing device to relay to the hardware serial component of the remote computing device to send to the peripheral device of the remote computing device over the serial bus of the remote computing device;
- receiving, by the serial driver from the application computer program, second communication for the peripheral device of the local computing device;
- after receiving the second communication, determining by the serial driver that the second communication is for the peripheral device of the local computing device; and
- in response to determining that the second communication is for the peripheral device of the local computing device, sending the second communication by the serial driver to the peripheral device of the local computing device over the serial bus of the local computing device,
- wherein and such that the serial driver receives both the first communication for the peripheral device of the remote computing device and the second communication for the peripheral device of the local computing device,
- and wherein a serial driver of the remote computing device unwraps the frame including the first communication from the network packet upon the remote computing device receiving the network packet.

9. The method of claim 8, wherein the serial driver, the network driver, and the first device driver of the local computing device interact with one another to permit the local computing device to communicate with the peripheral device of the remote computing device.

10. The method of claim 8, wherein the serial driver and the second device driver of the local computing device interact with one another to permit the local computing device to communicate with the peripheral device of the local computing device.

* * * * *